(12) United States Patent
Hernandez

(10) Patent No.: US 9,254,780 B2
(45) Date of Patent: Feb. 9, 2016

(54) LOAD PROTECTION BAR

(71) Applicant: Gabriel Hernandez, Los Banos, CA (US)

(72) Inventor: Gabriel Hernandez, Los Banos, CA (US)

( * ) Notice: Subject to any disclaimer, the term of this patent is extended or adjusted under 35 U.S.C. 154(b) by 0 days.

(21) Appl. No.: 14/034,316

(22) Filed: Sep. 23, 2013

(65) Prior Publication Data

US 2015/0086289 A1    Mar. 26, 2015

(51) Int. Cl.
*B60P 7/08* (2006.01)
*B60P 7/15* (2006.01)

(52) U.S. Cl.
CPC .......................... *B60P 7/15* (2013.01)

(58) Field of Classification Search
CPC .......................................................... B60P 7/15
USPC .................................. 410/143, 145, 151, 153
See application file for complete search history.

(56) References Cited

U.S. PATENT DOCUMENTS 4,023,819 A * 5/1977 Holman, Jr. ............... 410/151
5,553,825 A * 9/1996 Rasmussen

* cited by examiner

*Primary Examiner* — Stephen Gordon
(74) *Attorney, Agent, or Firm* — Loza & Loza, LLP; Daniel S. Castro

(57) ABSTRACT

Aspects for rigidly positioning a load-bearing bar are disclosed. In one aspect, a method includes positioning a bar between two surfaces so that one end is oriented towards one surface, and the other end is oriented towards another surface. The method also comprises rotating a crank to facilitate having each end make contact with its corresponding surface. Here, rotating the crank extends an extension shaft away from a control shaft, whereas rotating in an opposite direction inserts the extension shaft into the control shaft. An apparatus is also disclosed, which includes a control shaft comprising a crank that rotates a gear assembly, and an extension shaft coupled to the control shaft. Here, the extension shaft extends away from the control shaft when the gear assembly rotates in a first direction, and retracts when the gear assembly rotates in an opposite direction.

8 Claims, 10 Drawing Sheets

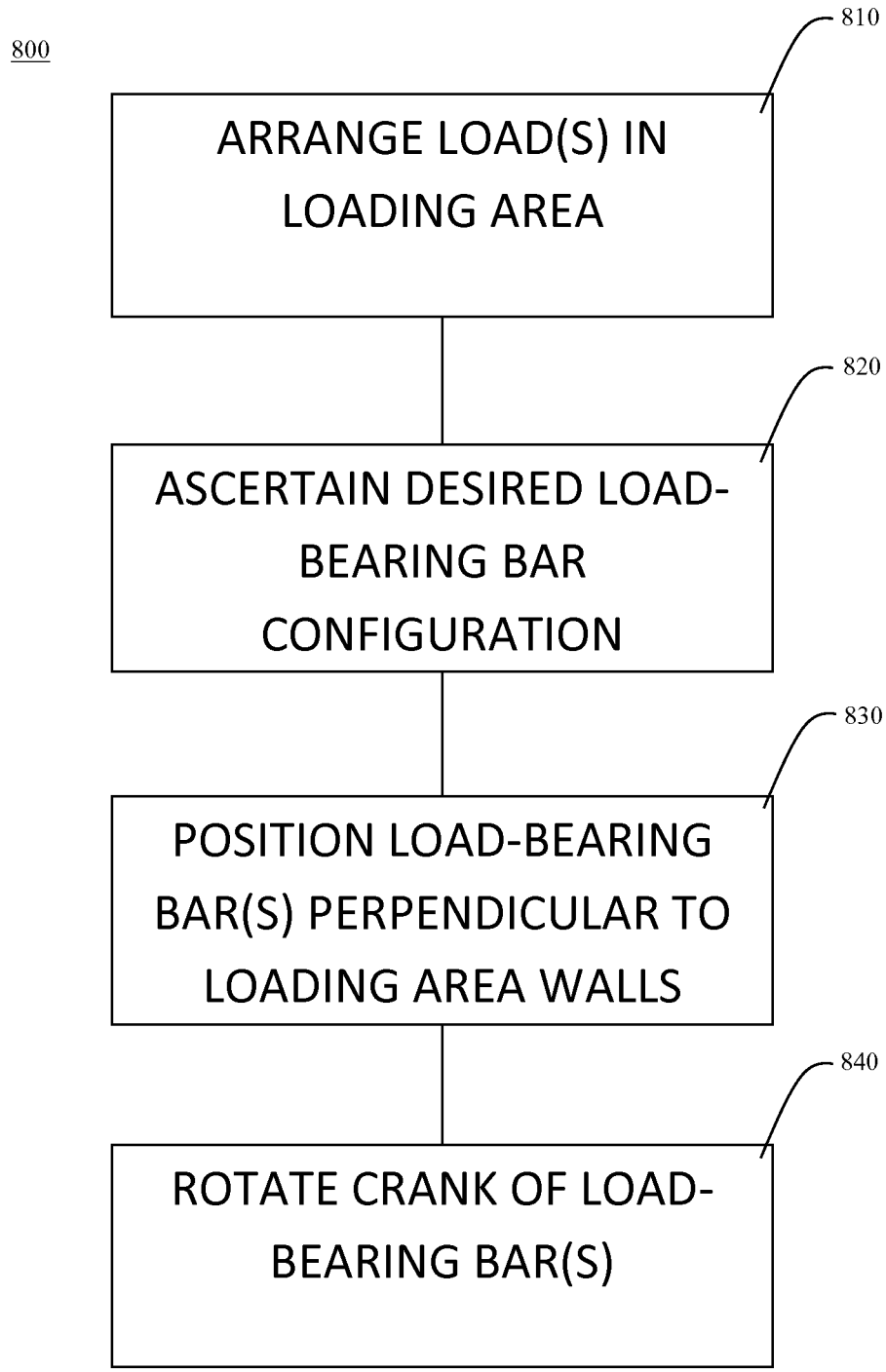

LOAD PROTECTION BAR

TECHNICAL FIELD

The subject disclosure generally relates to a load protection bar, and more specifically to a method and apparatus that facilitates a rigid positioning of such a bar between walls.

BACKGROUND

By way of background concerning conventional methods for stabilizing a load on a vehicle, it is first noted that such loads are often heavy. If not properly stabilized, these loads may thus undesirably slide behind a vehicle during transit and cause substantial damage to both the load and the vehicle. To this end, although conventional load protection bars may adequately stabilize light loads, such bars often lack the strength to stabilize heavier loads. Namely, because conventional load protection bars lack a mechanism for rigidly positioning themselves against walls with enough strength to stabilize heavier loads, such bars will simply slide off or break when a heavier load is pushed against it.

Accordingly, it would be desirable to provide a methodology for stabilizing a load which overcomes these limitations. To this end, it should be noted that the above-described deficiencies are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In accordance with one or more embodiments and corresponding disclosure, various non-limiting aspects are described in connection with a rigid positioning of a load-bearing bar between walls. In one such aspect, load-bearing bar apparatus is disclosed. Within such embodiment, the load-bearing bar apparatus comprises control shaft that includes a crank coupled to a gear assembly. The load-bearing bar apparatus further comprises an extension screw coupled to the gear assembly, such that the extension screw is configured to extend away from the control shaft when the crank is rotated in a first direction, and toward the control shaft when the crank is rotated in a second direction counter to the first direction. The load-bearing bar apparatus also comprise an extension shaft coupled to the control shaft via the extension screw, such that the extension shaft is configured to extend away from the control shaft when the crank is rotated in the first direction, and toward the control shaft when the crank is rotated in the second direction.

In another aspect, a method to facilitate using a load-bearing bar is provided, which includes positioning a load-bearing bar between a first surface and a second surface parallel to the first surface. For this particular embodiment, a first end of the load-bearing bar is oriented towards the first surface, and a second end of the load-bearing bar is oriented towards the second surface. The method also comprises rotating a crank portion of the load-bearing bar to facilitate a first contact between the first end and the first surface and a second contact between the second end and the second surface. Here, the rotating facilitates extending an extension shaft portion of the load-bearing bar away from a control shaft portion of the load-bearing bar when the crank portion is rotated in a first direction, whereas the rotating facilitates inserting the extension shaft portion of the load-bearing bar into the control shaft portion of the load-bearing bar when the crank portion is rotated in a second direction counter to the first direction.

In a further aspect, a load-protection bar apparatus is disclosed. Within such embodiment, the load-protection bar apparatus includes a control shaft comprising a crank configured to rotate a gear assembly, and an extension shaft coupled to the control shaft via an extension screw. Here, the extension shaft is configured to extend away from the control shaft when the gear assembly is rotated in a first direction, whereas the extension shaft is configured to retract toward the control shaft when the gear assembly is rotated in a second direction opposite to the first direction.

Other embodiments and various non-limiting examples, scenarios and implementations are described in more detail below.

BRIEF DESCRIPTION OF THE DRAWINGS

Various non-limiting embodiments are further described with reference to the accompanying drawings in which:

FIG. 8 is a flow diagram of an exemplary methodology that facilitates utilizing a load-bearing bar according to an embodiment;

DETAILED DESCRIPTION

Overview

As discussed in the background, conventional methods for stabilizing a load on a vehicle lack a mechanism for rigidly positioning themselves against walls with enough strength to stabilize heavier loads. The embodiments disclosed herein are directed towards overcoming such limitations via a heavy duty load-bearing bar configured to expand against opposite-facing walls with substantially more force than conventional bars. Namely, a heavy duty load-bearing bar is disclosed which utilizes a gear assembly to facilitate achieving such force via a crank configured to rotate the gear assembly.

Exemplary Embodiments

Various exemplary non-limiting embodiments directed towards a heavy duty load-bearing bar are now disclosed. To this end, it is noted that the embodiments described herein are not intended to be exhaustive, and that one of ordinary skill will appreciate that various undisclosed embodiments also fall within the scope and spirit of the instant invention.

Figure 1:
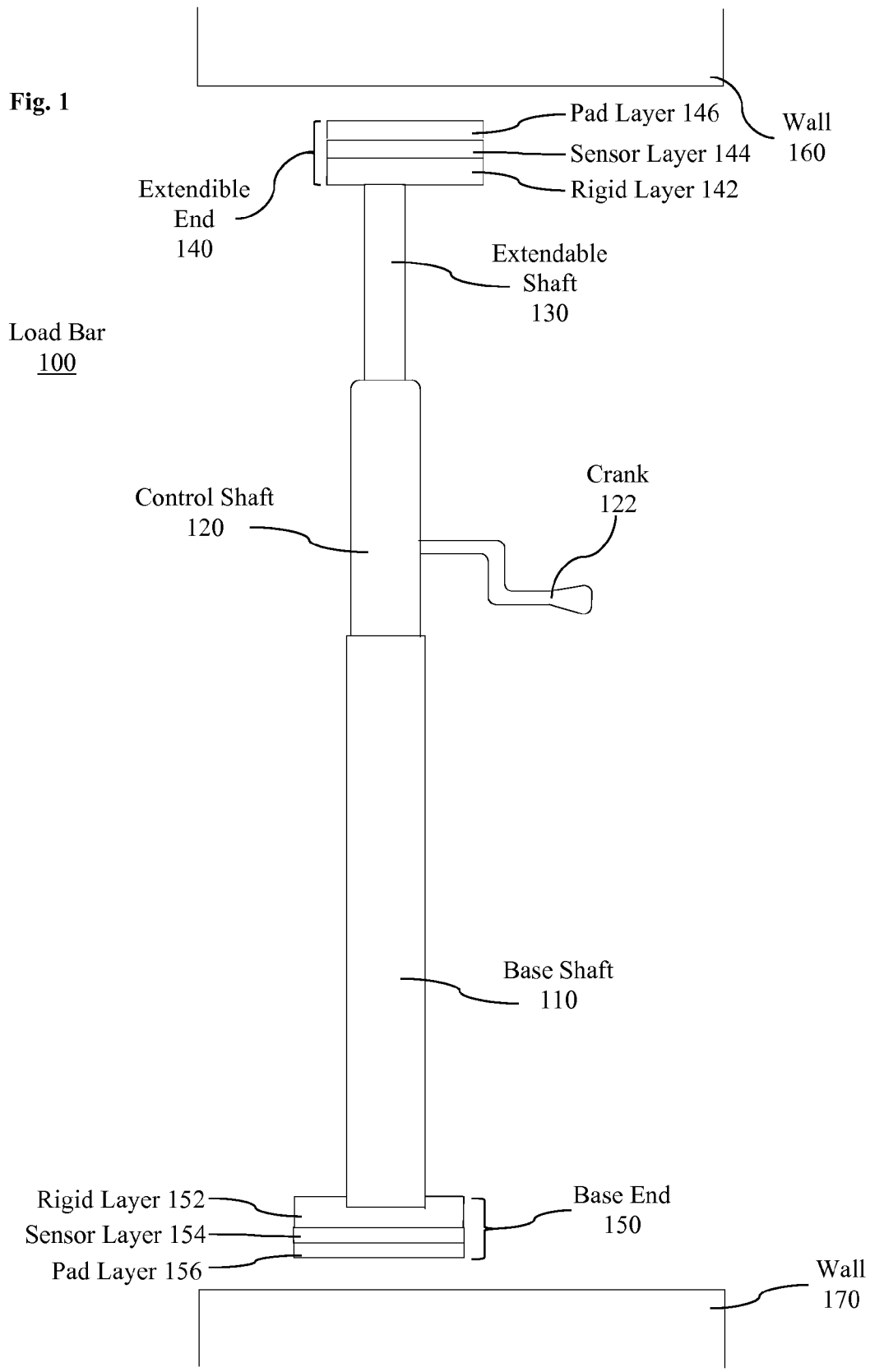
FIG. 1 illustrates an exemplary load-bearing bar in accordance with an aspect of the subject specification.

Referring first to FIG. 1, an exemplary load-bearing bar is provided according to an embodiment. As illustrated, load bar 100 may be configured to include a plurality of shafts, such as base shaft 110, control shaft 120, and extendable shaft 130. Here, although base shaft 110 is included, embodiments that exclude such component are also contemplated (See e.g., FIGS. 4-5). For this particular example, however, base shaft 110 is further configured to include base end 150, as shown, wherein base end 150 includes rigid layer 152, sensor layer 154, and pad layer 156. Similarly, extendable shaft 130 may be configured to include extendable end 140, wherein extendable end 140 includes rigid layer 142, sensor layer 144, and pad layer 146.

During use, extendable shaft 130 is configured to extend out from control shaft 120 when crank 122 is rotated. Namely, as crank 122 is rotated, extendable shaft 130 is extended so that extendable end 140 approaches wall 160. Upon extendable end 140 making contact with wall 160, crank 122 can then be further rotated to more rigidly affix load bar 100 between wall 160 and wall 170. Moreover, as crank 122 is further rotated, the extension of extendable shaft 130 causes extendable end 140 to apply an increasing amount of pressure on wall 160, wherein an increasing amount of pressure is similarly applied on wall 170 via base end 150, as well.

In order to accommodate for the forces applied to wall 160 and wall 170, each of extendable end 140 and base end 150 can be configured to include any of various specialized layers, as shown. For instance, rigid layer 142 and/or rigid layer 152 can be made from a strong rigid material (e.g., heavy duty steel) capable of preserving the structural integrity of load bar 100 as increased force is applied to wall 160 and wall 170. A softer layer, however, might be desired for making contact with wall 160 and wall 170, such as pad layer 146 and pad layer 156. Indeed, so as to avoid damaging wall 160 and wall 170, pad layer 146 and pad layer 156 can be made from a soft sponge-like material.

In another aspect, it is noted that knowing the actual pressure/force applied onto wall 160 and wall 170 may be desirable for various reasons. For instance, it would be desirable to know whether a minimum threshold force has been reached (e.g., to ensure that a load of a particular weight can be stabilized), as well as whether a maximum threshold force has been reached (e.g., to avoid excessive cranking which might damage a wall). In a particular embodiment, it is thus contemplated that each of extendable end 140 and base end 150 can be further configured to include sensor layer 144 and sensor layer 154, as shown. Within such embodiment, sensor layer 144 and sensor layer 154 are configured to respectively sense the pressure/force applied onto wall 160 and wall 170.

It should be appreciated that sensor layer 144 and sensor layer 154 may be configured to sense and/or communicate such pressure/force in any of a plurality of ways. For instance, sensor layer 144 and/or sensor layer 154 can be configured to include a computing device programmed to issue an alert when either of the aforementioned minimum/maximum thresholds have been reached. Within such embodiment, the computing device may be coupled to a pressure sensor configured to gauge pressure, wherein qualitative and/or quantitative data can be communicated. Qualitative communications may, for example, include configuring the computing device to emit a "beeping" sound when a minimum/maximum threshold is reached. Alternatively, the computing device may be configured to relay the alert to an auxiliary device (e.g., a smartphone, tablet, etc.) via a communication network (e.g., via blue tooth, short messaging service, etc.). Quantitative communications may then, for example, include displaying actual pressure data by coupling the pressure sensor to a display device (e.g., a liquid crystal display on load bar 100), or relaying the quantitative data to an auxiliary device (e.g., a smartphone, tablet, etc.) via a communication network (e.g., via blue tooth, short messaging service, etc.).

In another aspect, it is noted loads stabilized by load bar 100 may sometimes be fragile. Accordingly, in order to mitigate potential damages, any of base shaft 110, control shaft 120, and/or extendable shaft 130 can be configured to include an exterior padding layer. Contact between a load and any of base shaft 110, control shaft 120, and/or extendable shaft 130 will thus be cushioned by the exterior padding, which could be particularly useful for fragile loads that might slide in the back of a vehicle during transit, for example.

Figure 2:
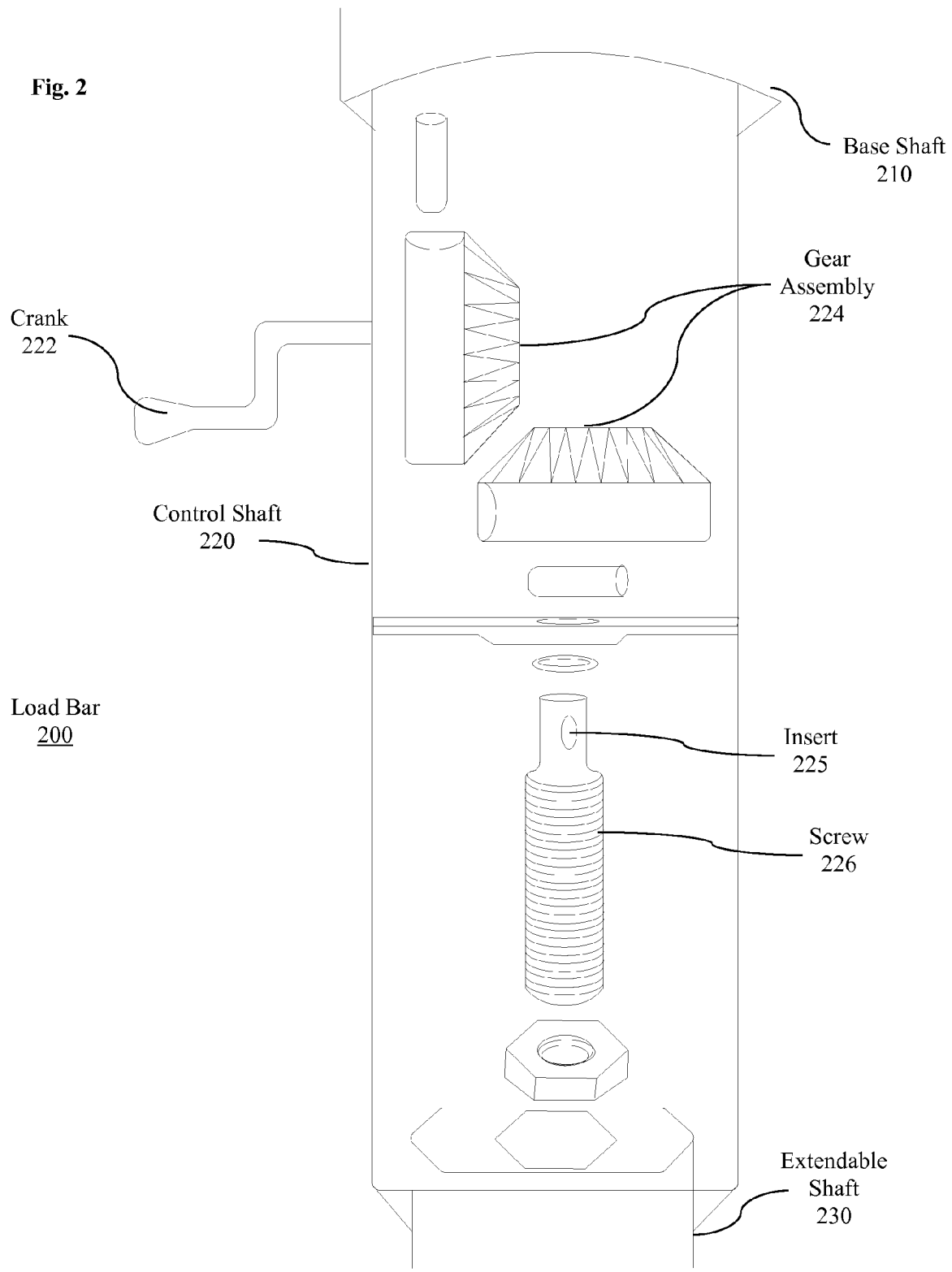
FIG. 2 is an internal schematic of an exemplary unassembled load-bearing bar according to an embodiment.

Referring next to FIG. 2, an internal schematic of an exemplary unassembled load-bearing bar is provided according to an embodiment. As illustrated, load bar 200 may include a plurality of shafts, such as base shaft 210, control shaft 220, and extendable shaft 230. Load bar 200 may further comprise crank 222, gear assembly 224, and extension screw 226, as shown, wherein extension screw 226 may further comprise insert 225. Here, although gear assembly 224 only shows two gears, it should be appreciated that a gear assembly having any number of gears can be utilized, as well as gears of various sizes.

Figure 3:
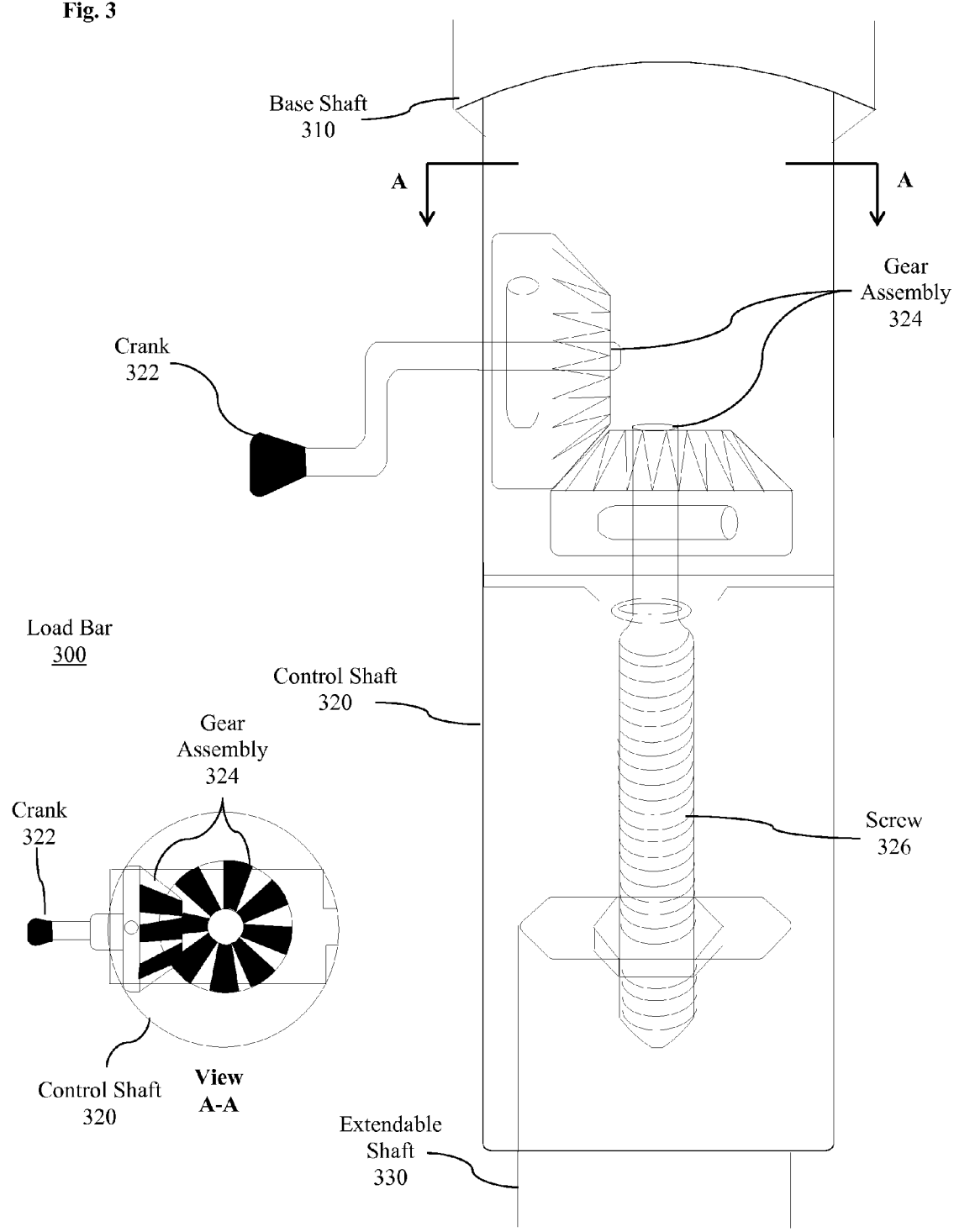
FIG. 3 is an internal schematic of an exemplary assembled load-bearing bar according to an embodiment.

In FIG. 3, an internal schematic of an exemplary assembled load-bearing bar is now provided according to an embodiment. To this end, it should be noted that load bar 300 illustrated in FIG. 3 is substantially similar to load bar 200 illustrated in FIG. 2. For instance, load bar 300 may again include a plurality of shafts, such as base shaft 310, control shaft 320, and extendable shaft 330. As assembled, crank 322 is coupled to gear assembly 324, as shown, wherein rotating crank 322 causes the gears in gear assembly 324 to rotate. Namely, for this particular embodiment, while crank 322 turns a first gear of gear assembly 324, a second gear of gear assembly 324 rotates extension screw 326. The rotation of extension screw 326 then causes extendable shaft 330 to extend, as desired.

Figure 4:
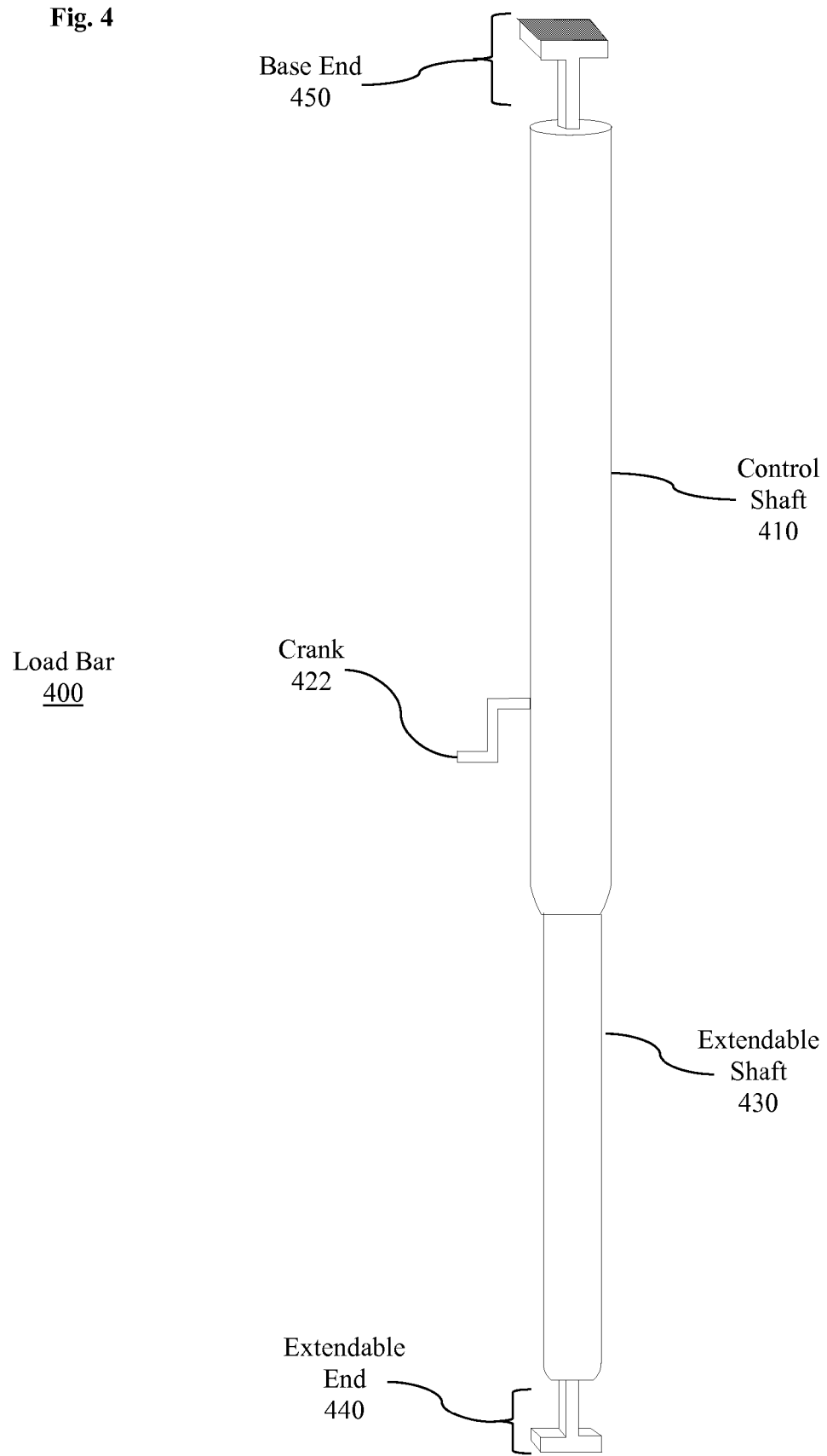
FIG. 4 illustrates an exemplary load-bearing bar having a circular-shaped cross section in accordance with an aspect of the subject specification.

In another aspect, it is contemplated that a load bar's dimensions may be customized to accommodate any of various applications. For instance, on occasion, it may be desirable utilize a load-bearing bar having a circular-shaped cross section, as illustrated in FIG. 4. Indeed, a load-bearing bar with such dimensions may desirably serve as an impromptu garment rack between any two walls, wherein the circular-shaped cross section facilitates a hanging of conventional clothes hangers. For this particular embodiment, each of control shaft 420 and extendable shaft 430 of load bar 400 have a circular-shaped cross section, as shown. As mentioned previously, although a base shaft may be included in some configurations, embodiments which exclude such component are also contemplated. Load bar 400, for instance, excludes a base shaft, wherein control shaft 420 is coupled to base end 450 on one end, and coupled to extendable shaft 430 on another end. Similar to the aforementioned embodiments, however, rotating crank 422 causes extendable shaft 430 to extend out from control shaft 420 until extendable end 440 and base end 450 are securely affixed between two desired walls.

Figure 5:
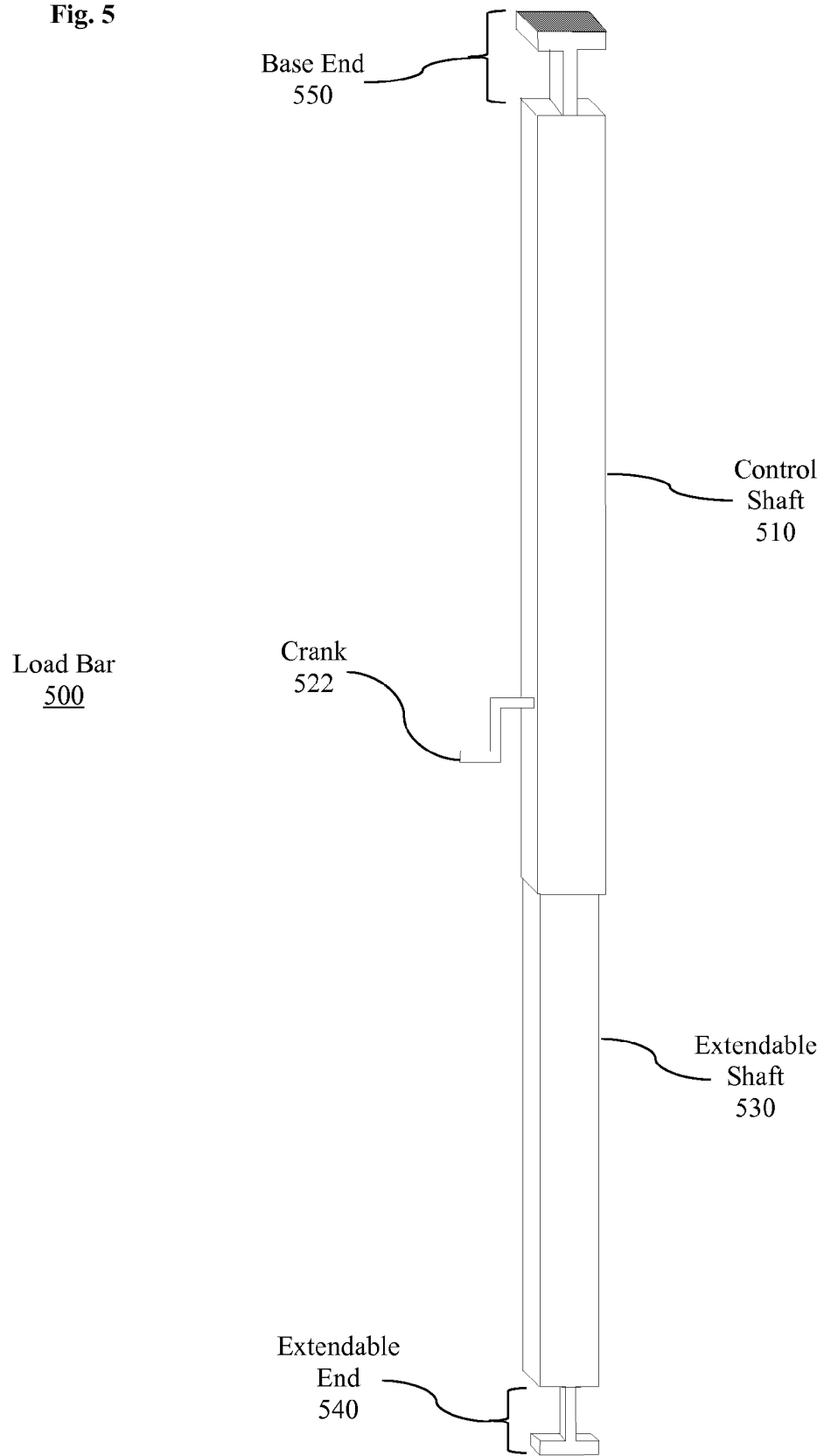
FIG. 5 illustrates an exemplary load-bearing bar having a square-shaped cross section in accordance with an aspect of the subject specification.

In yet another aspect, it is contemplated that a load-bearing bar having a square-shaped cross section, as illustrated in FIG. 5, may also be desirable. For instance, when storing/transporting multiple load-bearing bars, such dimensions may desirably facilitate a horizontal stacking of bars on top of each other. For this particular embodiment, each of control shaft 520 and extendable shaft 530 of load bar 500 have a square-shaped cross section, as shown. Similar to load bar 400, rotating crank 522 causes extendable shaft 530 to extend out from control shaft 520 until extendable end 540 and base end 550 are securely affixed between two desired walls.

Figure 6A:
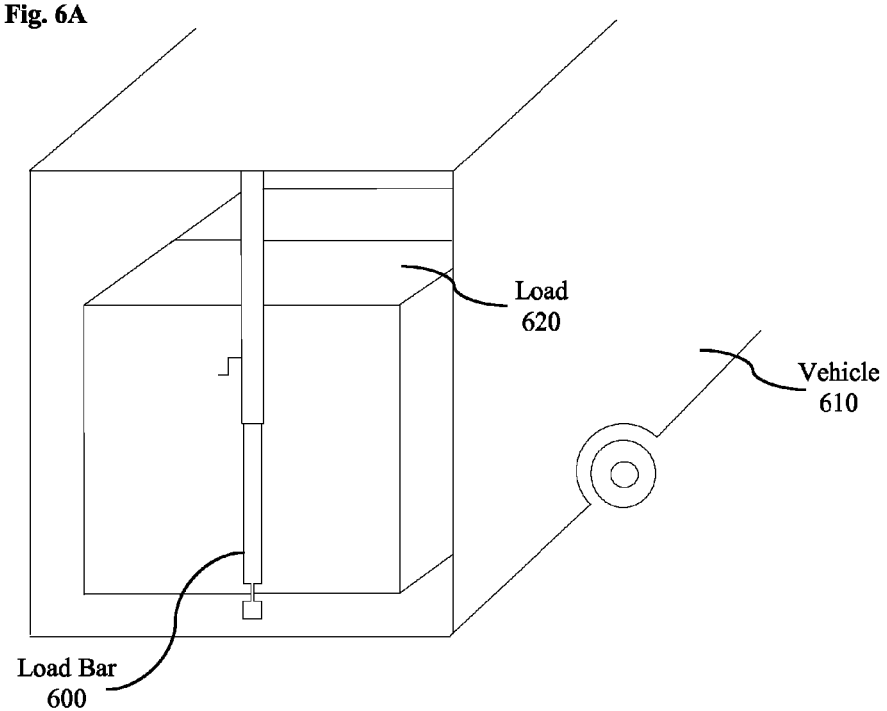
FIG. 6A illustrates an exemplary vertical usage of a load-bearing bar according to an embodiment.
Figure 6B:
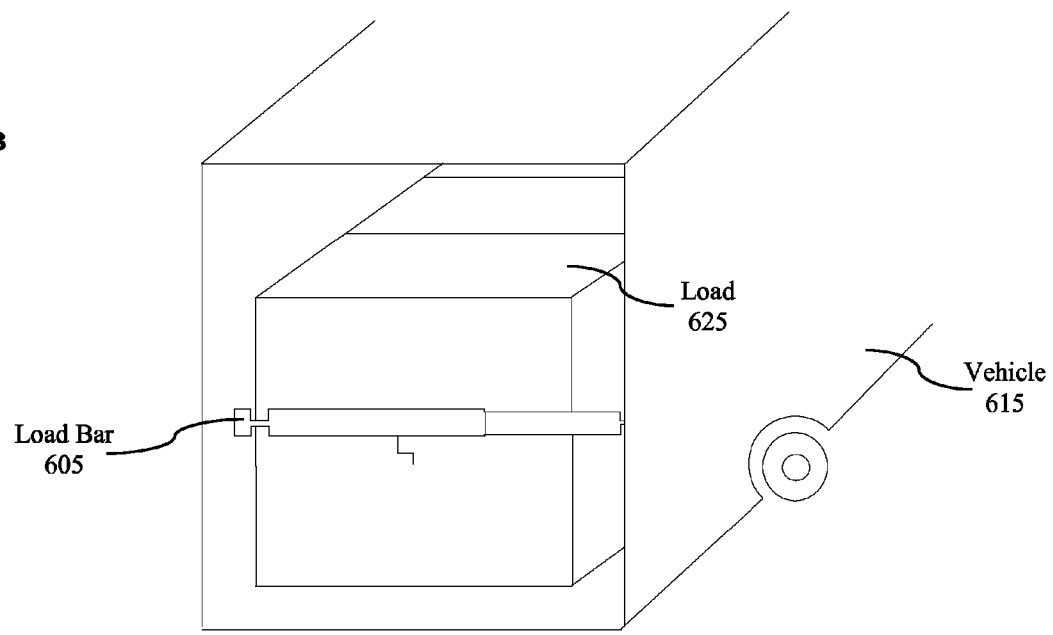
FIG. 6B illustrates an exemplary horizontal usage of a load-bearing bar according to an embodiment.

Referring next to FIGS. 6A-6B, exemplary uses of load-bearing bars are provided in accordance with corresponding embodiments. In FIG. 6A, for example, a vertical usage of a load-bearing bar is illustrated, whereas FIG. 6B illustrates an exemplary horizontal usage. Namely, in FIG. 6A, load bar 600 is configured vertically to stabilize load 620 behind vehicle 610, whereas FIG. 6B illustrates a horizontal configuration of load bar 605 to stabilize load 625 behind vehicle 615. To this end, it should be noted that choosing between a vertical or horizontal usage may depend on any of various factors (e.g., load configuration, wall dimensions, etc.).

Figure 7A:
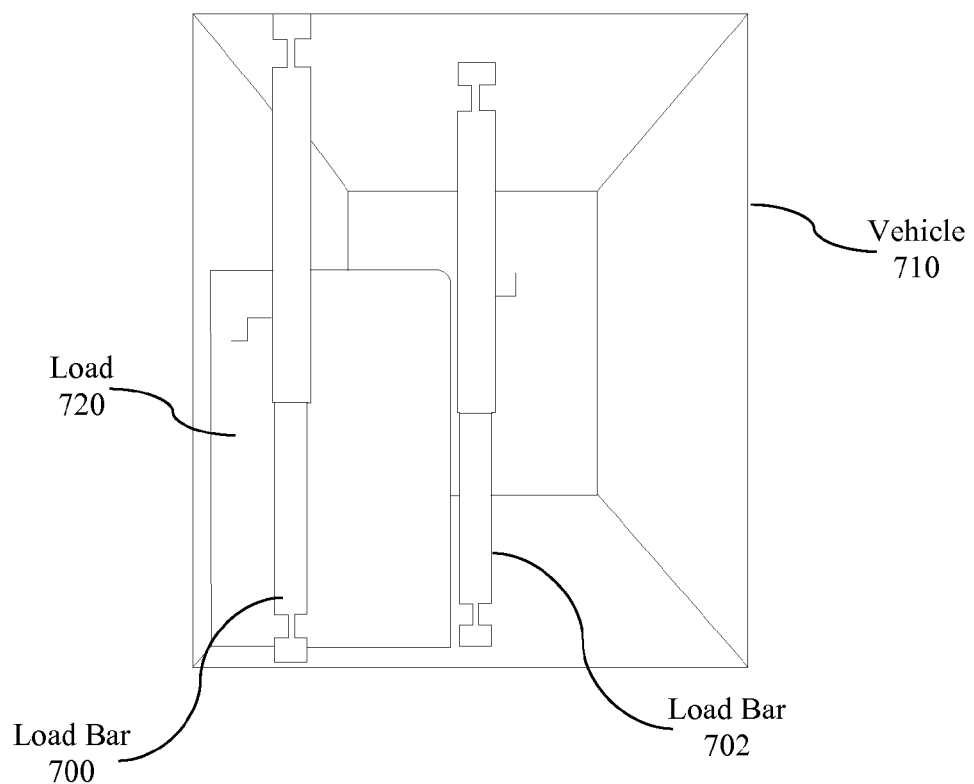
FIG. 7A illustrates an exemplary vertical usage of multiple load-bearing bars according to an embodiment.
Figure 7B:
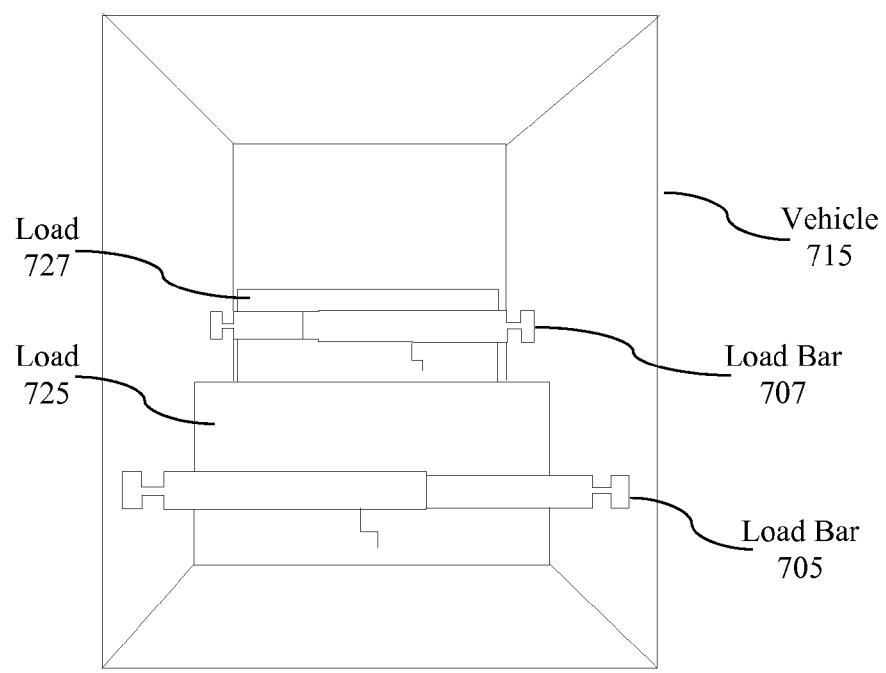
FIG. 7B illustrates an exemplary horizontal usage of multiple load-bearing bars according to an embodiment.

The simultaneous use of multiple load-bearing bars is also contemplated, as illustrated in FIGS. 7A-7B. In FIG. 7A, for example, a vertical usage of multiple load-bearing bars is illustrated, whereas FIG. 7B illustrates an exemplary horizontal usage of multiple bars. Specifically, in FIG. 7A, load bar 700 and load bar 702 are configured vertically to stabilize load 720 in a corner behind vehicle 710, whereas FIG. 7B illustrates a horizontal configuration of load bar 705 and load bar 707 to respectively stabilize load 725 and load 727 behind vehicle 715.

Referring next to FIG. 8, a flow chart illustrating an exemplary method to facilitate utilizing a load-bearing bar according to an embodiment is provided. As illustrated, process 800 includes a series of acts that may be performed according to an aspect of the subject specification. Process 800 begins at act 810 with the arrangement of a load. Here, although such arrangement has been described with reference to vehicles, it should be noted that the aspects disclosed herein may be utilized anywhere in which load stabilization is desired. It should be further noted that the arrangement performed at act 810 may include any of various arrangements including, for example, the arrangement of a single load item (e.g., the cornering of load 720 illustrated in FIG. 7A), as well as the arrangement of multiple items (e.g., the stacking of load 725 and load 727 illustrated in FIG. 7B).

Once the load is properly arranged, process 800 then continues at act 820 where the particularly desired configuration of the load-bearing bar(s) is ascertained. Here, it is again noted that such configuration may include a vertical and/or horizontal configuration of a single load-bearing bar or multiple load-bearing bars. After deciding on a particular configuration, the load-bearing bar(s) is/are perpendicularly positioned relative to the desired walls at act 830. Process 800 then concludes at act 840 with a cranking of the load-bearing bar(s) until the load-bearing bar(s) is/are firmly affixed between the desired walls.

Exemplary Networked and Distributed Environments

One of ordinary skill in the art can appreciate that various embodiments for implementing the use of a computing device and related embodiments described herein can be implemented in connection with any computer or other client or server device, which can be deployed as part of a computer network or in a distributed computing environment, and can be connected to any kind of data store. Moreover, one of ordinary skill in the art will appreciate that such embodiments can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 9:
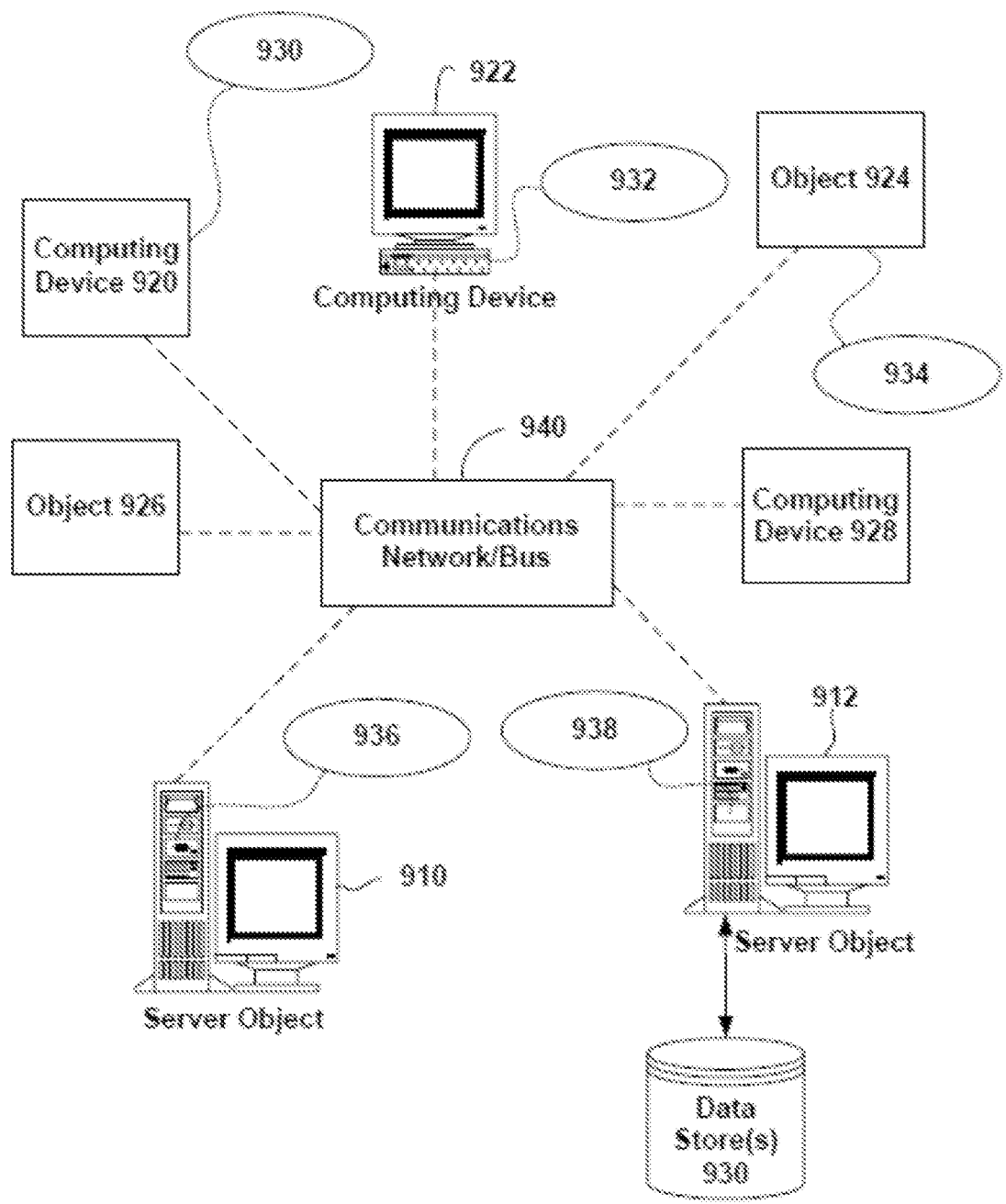
FIG. 9 is a block diagram representing exemplary non-limiting networked environments in which various embodiments described herein can be implemented.

FIG. 9 provides a non-limiting schematic diagram of an exemplary networked or distributed computing environment. The distributed computing environment comprises computing objects or devices 910, 912, etc. and computing objects or devices 920, 922, 924, 926, 928, etc., which may include programs, methods, data stores, programmable logic, etc., as represented by applications 930, 932, 934, 936, 938. It can be appreciated that computing objects or devices 910, 912, etc. and computing objects or devices 920, 922, 924, 926, 928, etc. may comprise different devices, such as PDAs (personal digital assistants), audio/video devices, mobile phones, MP3 players, laptops, etc.

Each computing object or device 910, 912, etc. and computing objects or devices 920, 922, 924, 926, 928, etc. can communicate with one or more other computing objects or devices 910, 912, etc. and computing objects or devices 920, 922, 924, 926, 928, etc. by way of the communications network 940, either directly or indirectly. Even though illustrated as a single element in FIG. 9, network 940 may comprise other computing objects and computing devices that provide services to the system of FIG. 9, and/or may represent multiple interconnected networks, which are not shown. Each computing object or device 910, 912, etc. or 920, 922, 924, 926, 928, etc. can also contain an application, such as applications 930, 932, 934, 936, 938, that might make use of an API (application programming interface), or other object, software, firmware and/or hardware, suitable for communication with or implementation of the disclosed aspects in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 9, as a non-limiting example, computing objects or devices 920, 922, 924, 926, 928, etc. can be thought of as clients and computing objects or devices 910, 912, etc. can be thought of as servers where computing objects or devices 910, 912, etc. provide data services, such as receiving data from computing objects or devices 920, 922, 924, 926, 928, etc., storing of data, processing of data, transmitting data to computing objects or devices 920, 922, 924, 926, 928, etc., although any computer can be considered a client, a server, or both, depending on the circumstances. Any of these computing devices may be processing data, or requesting services or tasks that may implicate aspects and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user profiling can be provided standalone, or distributed across multiple computing devices or objects.

In a network environment in which the communications network/bus 940 is the Internet, for example, the computing objects or devices 910, 912, etc. can be Web servers with which the computing objects or devices 920, 922, 924, 926, 928, etc. communicate via any of a number of known protocols, such as HTTP. As mentioned, computing objects or devices 910, 912, etc. may also serve as computing objects or devices 920, 922, 924, 926, 928, etc., or vice versa, as may be characteristic of a distributed computing environment.

Exemplary Computing Device

As mentioned, several of the aforementioned embodiments apply to any device wherein it may be desirable to include a computing device to facilitate implementing the aspects disclosed herein. It is understood, therefore, that handheld, portable and other computing devices and computing objects of all kinds are contemplated for use in connection with the various embodiments described herein. Accordingly, the below general purpose remote computer described below in FIG. 10 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer executable instructions, such as program modules, being executed by one or more computers, such as client workstations, servers or other devices. Those skilled in the art will appreciate that network interactions may be practiced with a variety of computer system configurations and protocols.

Figure 10:
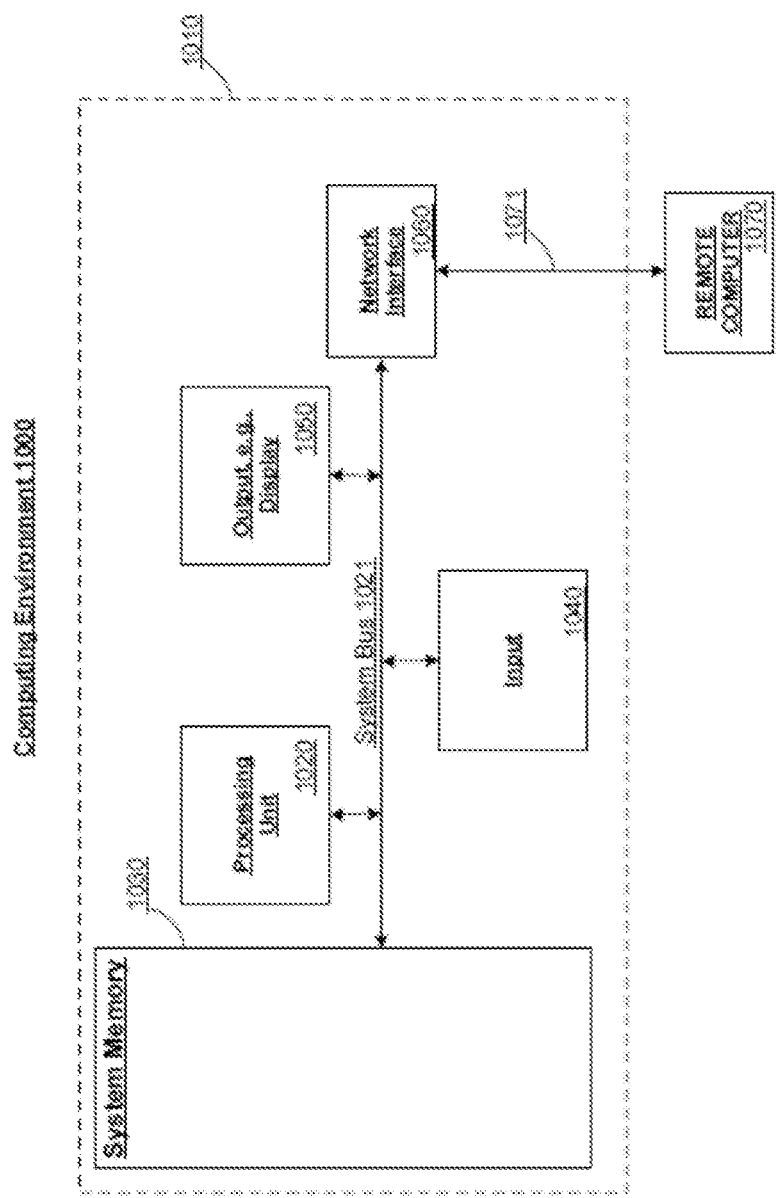
FIG. 10 is a block diagram representing an exemplary non-limiting computing system or operating environment in which one or more aspects of various embodiments described herein can be implemented.

FIG. 10 thus illustrates an example of a suitable computing system environment 1000 in which one or more of the embodiments may be implemented, although as made clear above, the computing system environment 1000 is only one example of a suitable computing environment and is not intended to suggest any limitation as to the scope of use or functionality of any of the embodiments. The computing environment 1000 is not to be interpreted as having any dependency or requirement relating to any one or combination of components illustrated in the exemplary operating environment 1000.

With reference to FIG. 10, an exemplary remote device for implementing one or more embodiments herein can include a general purpose computing device in the form of a handheld computer 1010. Components of handheld computer 1010 may include, but are not limited to, a processing unit 1020, a system memory 1030, and a system bus 1021 that couples various system components including the system memory to the processing unit 1020.

Computer 1010 typically includes a variety of computer readable media and can be any available media that can be accessed by computer 1010. The system memory 1030 may include computer storage media in the form of volatile and/or nonvolatile memory such as read only memory (ROM) and/or random access memory (RAM). By way of example, and not limitation, memory 1030 may also include an operating system, application programs, other program modules, and program data.

A user may enter commands and information into the computer 1010 through input devices 1040 A monitor or other type of display device is also connected to the system bus 1021 via an interface, such as output interface 1050. In addition to a monitor, computers may also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1071, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and advertising architectures, the underlying concepts may be applied to any network system and any computing device or system in which it is desirable to implement the aspects disclosed herein.

There are multiple ways of implementing one or more of the embodiments described herein, e.g., an appropriate API, tool kit, driver code, operating system, control, standalone or downloadable software object, etc. which enables applications to implement the aspects disclosed herein. Embodiments may be contemplated from the standpoint of an API (or other software object), as well as from a software or hardware object that facilitates implementing the aspects disclosed herein in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter can be appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While in some embodiments, a client side perspective is illustrated, it is to be understood for the avoidance of doubt that a corresponding server perspective exists, or vice versa. Similarly, where a method is practiced, a corresponding device can be provided having storage and at least one processor configured to practice that method via one or more components.

While the various embodiments have been described in connection with the preferred embodiments of the various figures, it is to be understood that other similar embodiments may be used or modifications and additions may be made to the described embodiment for performing the same function without deviating there from. Still further, one or more aspects of the above described embodiments may be implemented in or across a plurality of processing chips or devices, and storage may similarly be affected across a plurality of devices. Therefore, the present invention should not be limited to any single embodiment, but rather should be construed in breadth and scope in accordance with the appended claims.

What is claimed is:

1. A load-bearing bar apparatus, comprising:
   a control shaft, wherein the control shaft includes a crank coupled to a gear assembly;
   an extension screw coupled to the gear assembly, wherein the extension screw is configured to extend away from the control shaft when the crank is rotated in a first direction, and wherein the extension screw is configured to extend toward the control shaft when the crank is rotated in a second direction counter to the first direction; and
   an extension shaft coupled to the control shaft via the extension screw, wherein the extension shaft is configured to extend away from the control shaft when the crank is rotated in the first direction, and wherein the extension shaft is configured to extend toward the control shaft when the crank is rotated in the second direction,
   wherein an end of at least one of the control shaft or the extension shaft further comprises a sensor layer configured to gauge a pressure between the end and a surface.

2. The load-bearing bar apparatus according to claim 1, wherein a cross-section of at least one of the control shaft or the extension shaft is square-shaped.

3. The load-bearing bar apparatus according to claim 1, wherein a cross-section of at least one of the control shaft or the extension shaft is circular-shaped.

4. The load-bearing bar apparatus according to claim 1, wherein at least one of the control shaft or the extension shaft further comprises an exterior padding.

5. The load-bearing bar apparatus according to claim 1, wherein an end of at least one of the control shaft or the extension shaft further comprises a padding layer.

6. The load-bearing bar apparatus according to claim 1, further comprising a computing device configured to receive data from the sensor layer.

7. The load-bearing bar apparatus according to claim 6, wherein the computing device is further configured to provide an alert if the pressure between the end and the surface exceeds a minimal threshold.

8. The load-bearing bar apparatus according to claim 6, wherein the computing device is further configured to provide an alert if the pressure between the end and the surface exceeds a maximum threshold.

* * * * *